United States Patent
Karakotsios et al.

(10) Patent No.: US 9,152,185 B2
(45) Date of Patent: Oct. 6, 2015

(54) DORSAL TOUCH INPUT

(71) Applicant: Amazon Technologies, Inc., Reno, NV (US)

(72) Inventors: Kenneth M. Karakotsios, San Jose, CA (US); Bradley J. Bozarth, Sunnyvale, CA (US); Hannah Rebecca Lewbel, Campbell, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/196,787

(22) Filed: Mar. 4, 2014

(65) Prior Publication Data

US 2014/0253440 A1 Sep. 11, 2014

Related U.S. Application Data

(63) Continuation of application No. 12/827,392, filed on Jun. 30, 2010, now Pat. No. 8,698,764.

(51) Int. Cl.
  *G06F 1/16* (2006.01)
  *G06F 3/041* (2006.01)

(52) U.S. Cl.
  CPC ............. *G06F 1/1692* (2013.01); *G06F 3/041* (2013.01); *G06F 3/0416* (2013.01)

(58) Field of Classification Search
  None
  See application file for complete search history.

(56) References Cited

U.S. PATENT DOCUMENTS

| 5,581,484 | A | 12/1996 | Prince |
| 7,103,852 | B2 | 9/2006 | Kairis, Jr. |
| 7,401,300 | B2 | 7/2008 | Nurmi |
| 7,839,381 | B2 | 11/2010 | Zhou et al. |
| 2004/0263484 | A1* | 12/2004 | Mantysalo et al. ........... 345/173 |
| 2005/0206730 | A1 | 9/2005 | Hagiwara |
| 2005/0225538 | A1 | 10/2005 | Verhaegh |
| 2006/0197750 | A1* | 9/2006 | Kerr et al. ..................... 345/173 |
| 2006/0267953 | A1 | 11/2006 | Peterson, Jr. et al. |
| 2008/0001929 | A1 | 1/2008 | Wulff |
| 2008/0100586 | A1 | 5/2008 | Smart |
| 2008/0254837 | A1 | 10/2008 | Klinghult et al. |
| 2009/0201246 | A1 | 8/2009 | Lee et al. |
| 2009/0201260 | A1* | 8/2009 | Lee et al. ..................... 345/173 |
| 2009/0209293 | A1 | 8/2009 | Louch |
| 2009/0213081 | A1 | 8/2009 | Case, Jr. |
| 2010/0013777 | A1* | 1/2010 | Baudisch et al. ............. 345/173 |

(Continued)

FOREIGN PATENT DOCUMENTS

JP 2008/191791 A 8/2008

OTHER PUBLICATIONS

Juli Clover, "CES 2013: Canopy Sensus Case Adds Touch Controls to the iPhone's Back", retrieved at <<http://www.macrumors.com/2013/01/07/ces-2013-canopy-sensus-case-adds-touch-controls-to-the-iphones-back/>>, Jan. 7, 2013, 7 pages.

(Continued)

*Primary Examiner* — Joseph Haley
*Assistant Examiner* — Emily Frank
(74) *Attorney, Agent, or Firm* — Lee & Hayes, PLLC

(57) ABSTRACT

A back touch sensor positioned on a back surface of a device accepts user input in the form of touches. The touches on the back touch sensor map keys on a virtual keyboard, a pointer input, and so forth. Touches on a touch sensor positioned on a front surface provide additional input while also allowing the user to grasp and hold the device.

20 Claims, 13 Drawing Sheets

(56) References Cited

U.S. PATENT DOCUMENTS

| | | | |
|---|---|---|---|
| 2010/0127995 A1* | 5/2010 | Rigazio et al. | 345/173 |
| 2010/0225599 A1 | 9/2010 | Danielsson et al. | |
| 2010/0299596 A1 | 11/2010 | Zalewski et al. | |
| 2011/0021251 A1* | 1/2011 | Linden | 455/566 |
| 2011/0057889 A1* | 3/2011 | Sakatsume | 345/173 |
| 2011/0261058 A1* | 10/2011 | Luo | 345/441 |

OTHER PUBLICATIONS

Final Office Action for U.S. Appl. No. 12/940,831, mailed on Jan. 27, 2014, Hannah Rebecca Lewbel, "Adaptive Touch Sensor Interface", 29 pages.

Office action for U.S. Appl. No. 12/940,831, mailed on Jan. 15, 2013, Lewbel et al., "Adaptive Touch Sensor Interface", 20 pages.

Office action for U.S. Appl. No. 12/827,392, mailed on Feb. 15, 2013, Karakotsios et al., "Dorsal Touch Input", 25 pages.

Office action for U.S. Appl. No. 12/940,831, mailed on Jul. 8, 2013, Lewbel et al., "Adaptive Touch Sensor Interface", 26 pages.

Office action for U.S. Appl. No. 12/827,392, mailed on Aug. 8, 2013, Karakotsios et al., "Dorsal Touch Input", 6 pages.

Tiainen, "The GKOS Keyboard Principle", Global Keyboard Open Standard, Retrieved on Apr. 29, 2010 at <<http://koti.mbnet.fi/gkos/gkoscom/gkos_principle.html>>, 2 pgs.

Office action for U.S. Appl. No. 12/940,831, mailed on Sep. 11, 2014, Lewbel et al., "Adaptive Touch Sensor Interface", 29 pages.

* cited by examiner

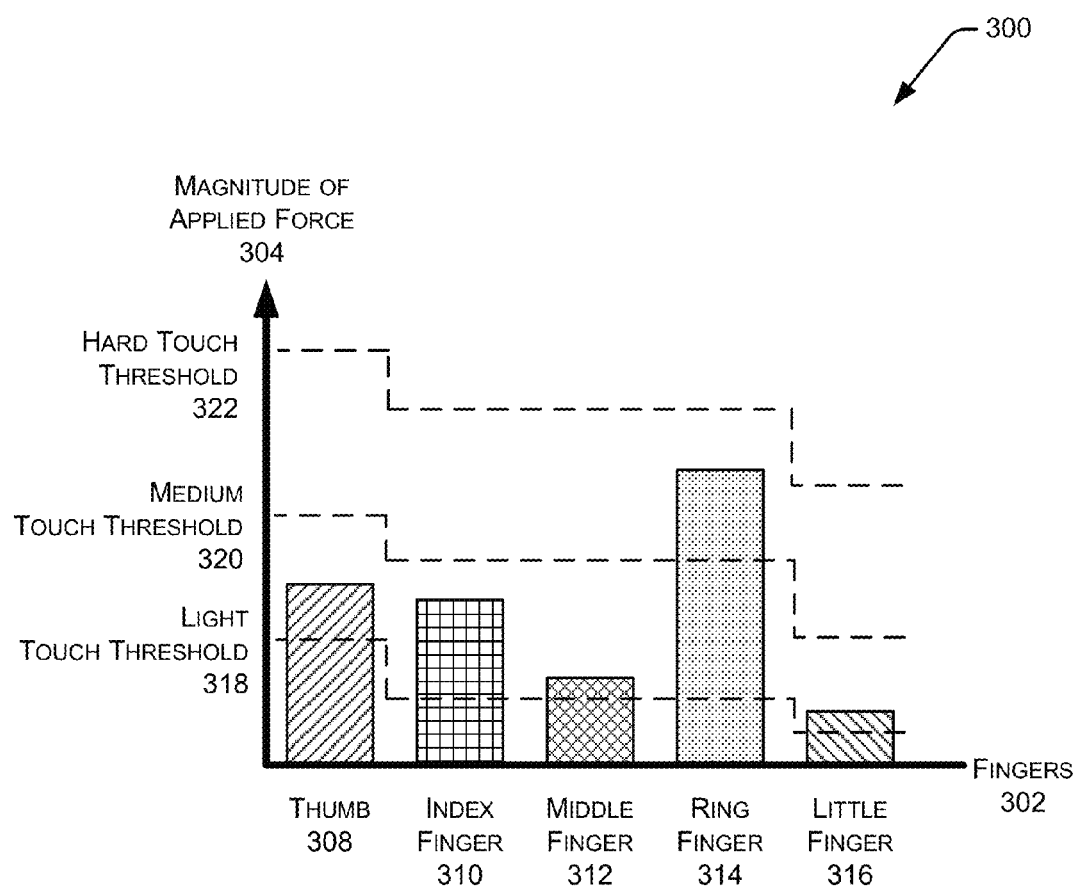
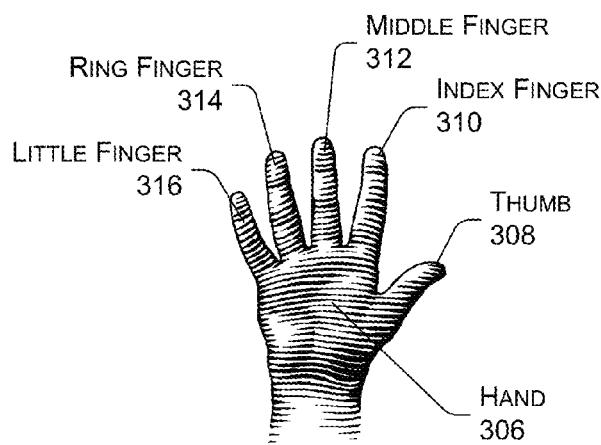
FIG. 3

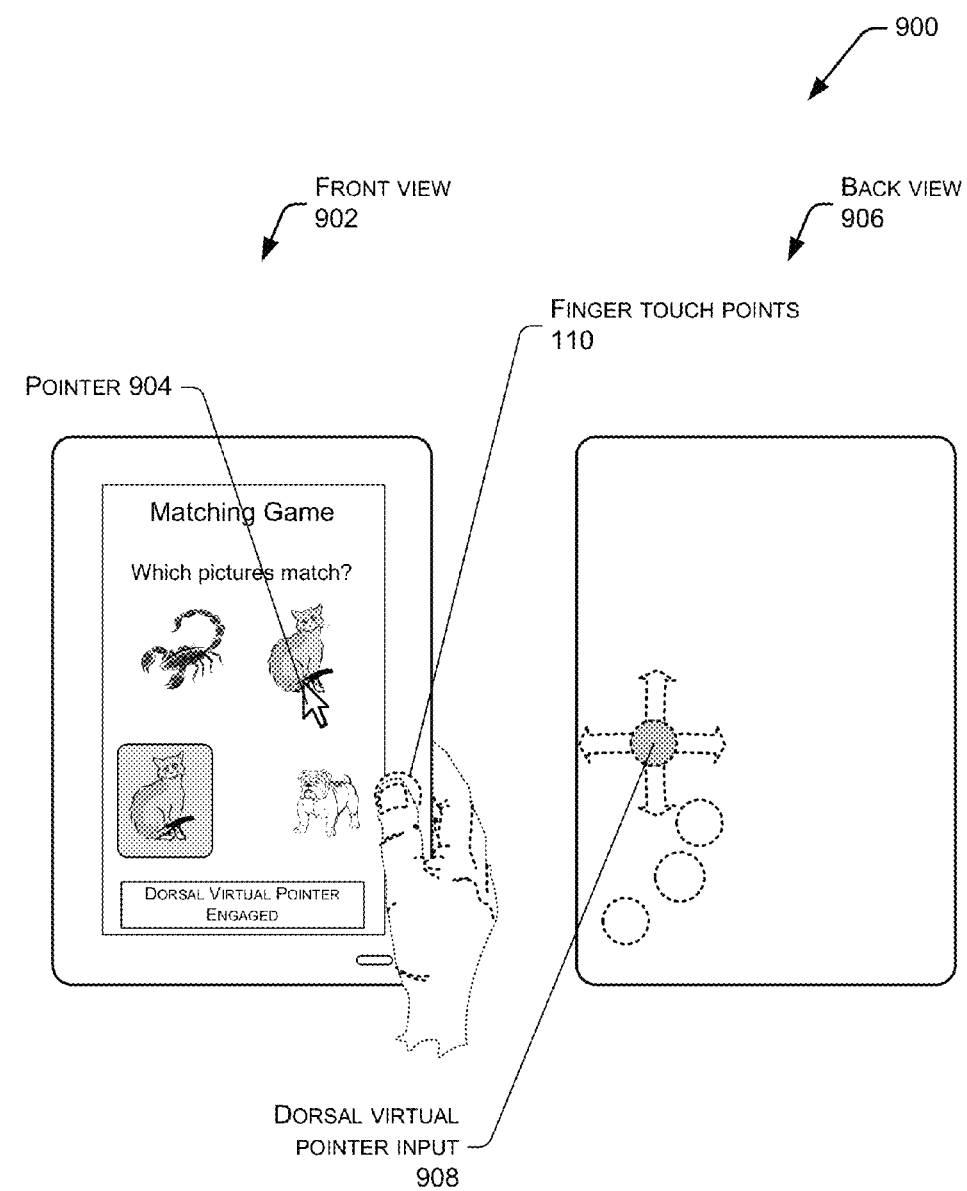
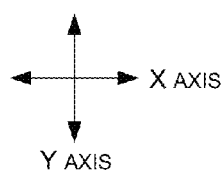
FIG. 9

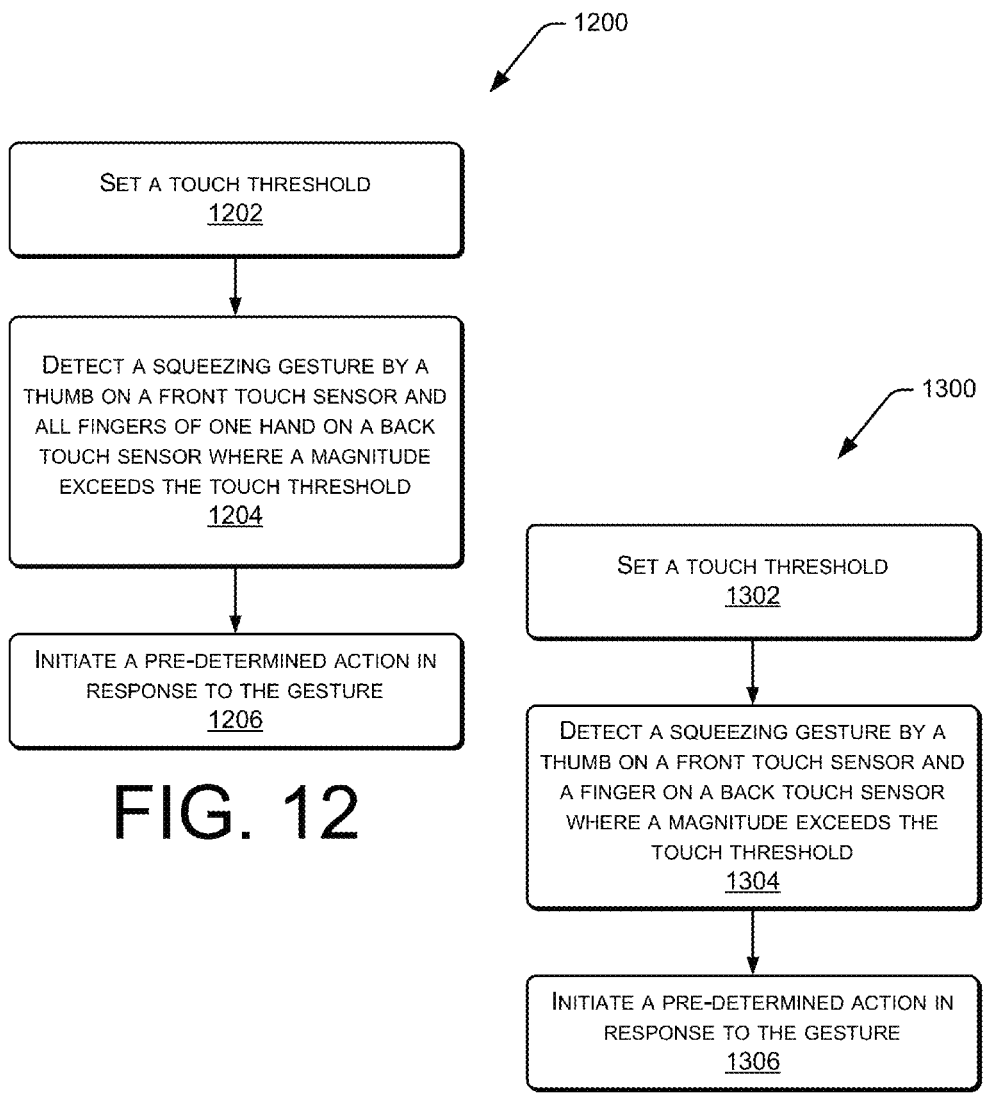

DORSAL TOUCH INPUT

RELATED APPLICATIONS

This application claims priority to U.S. patent application Ser. No. 12/827,392, filed on Jun. 30, 2010, and entitled "Dorsal Touch Input", which is incorporated herein by reference.

Related Applications

This application claims priority to U.S. patent application Ser. No. 12/827,392, filed on Jun. 30, 2010, and entitled "Dorsal Touch Input", which is incorporated herein by reference.

BACKGROUND

Electronic devices that accept input from users are ubiquitous, and include cellular phones, eBook readers, tablet computers, portable media devices, and so forth. Increasingly, users desire these devices to be easily portable yet remain capable of rapid and accurate data entry. Traditionally, input devices have been located on the front of the electronic device. However, placement of an input device on the front of an electronic device results in the user obscuring their view of a front-mounted display during data entry.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 3 is an illustrative graph showing force applied by fingers of one hand and associated touch thresholds for input on the touch sensor.

FIG. 9 depicts the electronic device with a dorsal virtual pointer engaged and configured to accept input from at least a portion of the back touch sensor as a pointer input.

FIG. 12 is an illustrative process of detecting a squeezing gesture involving each finger of a hand, which may be used as an engagement gesture for the dorsal virtual keyboard.

FIG. 13 is an illustrative process of detecting a squeezing gesture involving a thumb and finger of one hand, which may be used as an engagement gesture for the dorsal virtual pointer.

DETAILED DESCRIPTION

Overview

Figure 1:
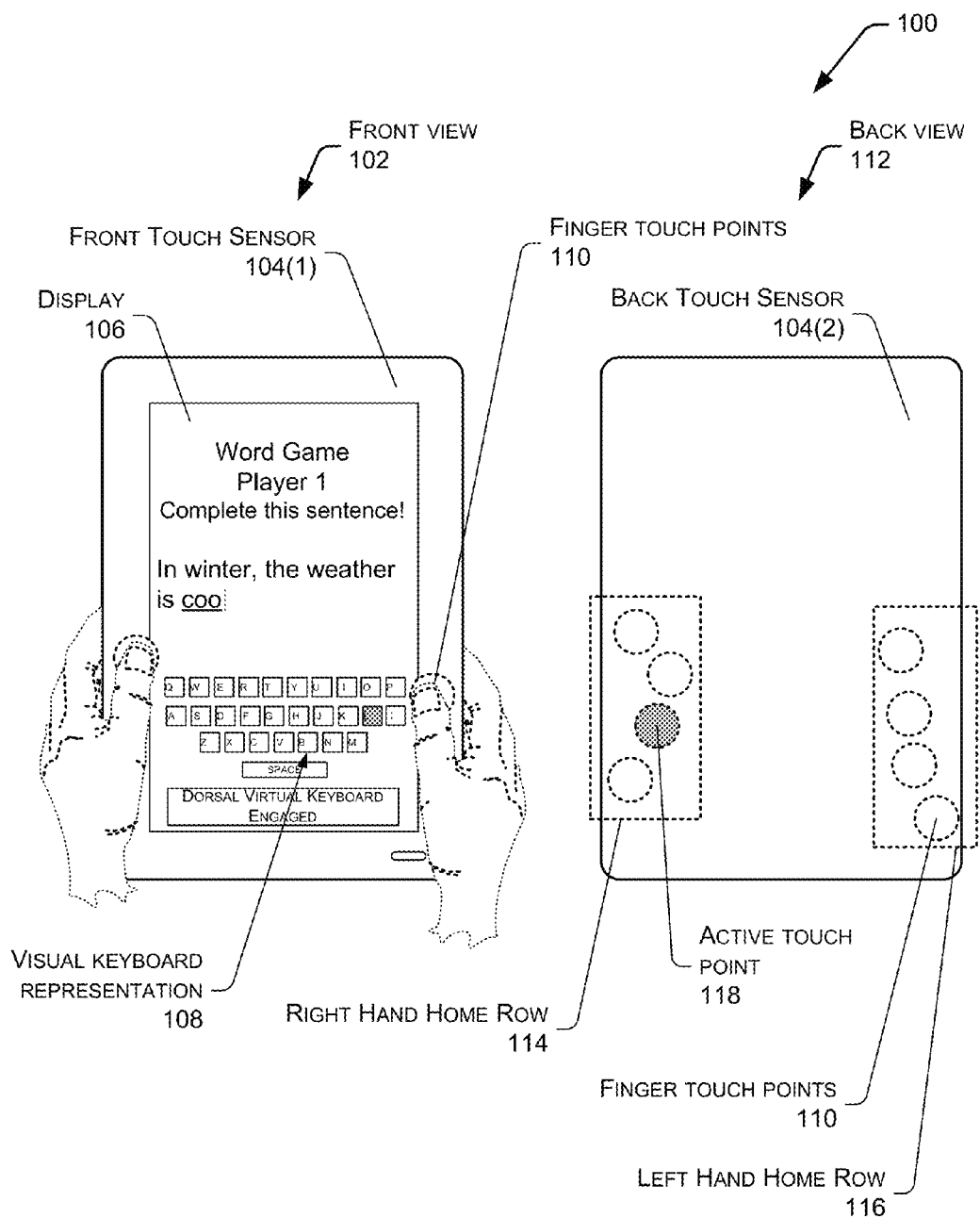
FIG. 1 depicts an electronic device configured to accept input from a back touch sensor via a dorsal virtual keyboard.

Electronic devices such as cellular phones, portable media players, tablet computers, netbooks, laptops, electronic book ("eBook") readers, and so forth, incorporate various input devices such as mechanical switches, touch sensors, and so forth to enable users to control and otherwise interact with the devices. Traditionally these input devices have been disposed upon the front of the device. This may result in a cluttered or complicated arrangement, particularly in smaller portable devices. In some devices, the touch sensor and a display combine to form a touch-sensitive display for input, allowing dual use of a front surface on a device. However, this results in occlusion of the display when the user actuates a portion of the touch sensor with a finger, stylus, and so forth. This occlusion renders it difficult for a user providing input via the touch-sensitive display to see a precise contact point. For example, the user's finger may obscure a cursor or crosshair which indicates a particular position.

This disclosure describes, in part, architecture and techniques for utilizing a touch sensor disposed on at least a portion of a back surface of an electronic device and forming a back touch sensor. The back touch sensor acts as an input device for a user. The back touch sensor may be configured to provide a dorsal virtual keyboard, a dorsal virtual pointer, and so forth. Such an arrangement provides the user with the ability to hold the device and provide input while minimizing obscuration of the display. The back touch sensor may reside on surfaces which are non-adjacent to and free from the display. For example, the back, sides, top, or bottom, of a device which has a single display on the front. A front touch sensor that is on and/or adjacent to the display may be used in conjunction with the back touch sensor to provide for additional functions and inputs.

When engaged, the dorsal virtual keyboard maps at least a portion of the keys of a virtual keyboard to positions on the back touch sensor. These positions may be absolute with relation to the back touch sensor, or relative to one or more of the user's fingers. When relative, the user may initiate an engagement gesture to set a home row of the virtual keyboard to the current position of the user's fingers. The positions of remaining non-home row keys are based upon the position of the now known home row keys. The engagement gesture may comprise a pre-determined set touches, movement of the device, activation of a switch, wireless signal from a device, data packet received via a network connection, and so forth.

A touch control module within the device processes touch sensor input, provides for setting the home row, engages and disengages modes, and so forth. The touch control module may also be configured to maintain touch thresholds. The user may change input by varying the amount of pressure applied. Touch thresholds for light touches, medium touches, hard touches, and so forth may be designated. The touch thresholds may be absolute or relative. For example, an absolute threshold may indicate that application of 1 newton (N) is a light touch, 2 N a medium touch, and 3 N a hard touch. Relative touch thresholds, in contrast, may be determined by relative force applied between digits or between touches. For example, a hard touch may be considered to be three times the force applied by the lightest touch. Thresholds may also be dynamic, and adjust over time. Thus, the virtual dorsal keyboard, virtual dorsal pointer, and so forth may adapt to the user over time.

Once designated and determined by the touch control module, the different touch thresholds may be used to affect the data input. For example, a light touch may be used to maintain tracking of a finger, a medium touch may be considered an input action, such as inputting a lower case letter, and a hard touch may be considered a different input action, such as entering a capital letter.

The relative position of the home row of fingers may also affect the data being input. A user may rotate their hands such that the home row is askew when compared to an original home row position. The touch control module may use this positioning to affect the data input. For example, such a rotation may result in text entered by the dorsal virtual keyboard being presented as italic.

The use of the dorsal virtual keyboard provides great flexibility in how users may interact with a device. Freed from reliance on a pre-determined physical keyboard, joystick, and other input devices, the user may hold and interact with the device in a way which is most appropriate for the task at hand, comfortable for the user, and so forth. For example, the user may rotate the device, reposition their hands, and continue data entry on the dorsal virtual keyboard.

Likewise, multiple users may contemporaneously input data. For example, two users may grasp opposite ends of the electronic device and use their respective dorsal virtual keyboards for data entry at about the same time. The touch control module, recognizing two sets of hands, maps two separate dorsal virtual keyboards onto the back touch sensor of the device.

Availability of the back touch sensor for user input allows for additional input gestures, particularly when combined with a touch sensor on a front surface. For example, squeezing gestures such as a force applied by the thumb on the front touch sensor and a force applied by one or more of the fingers on the back touch sensor are available.

The touch control module is also configurable to provide a dorsal virtual pointer. Upon engagement of the dorsal virtual pointer, a user may move one or more fingers across the back touch sensor to move a cursor, pointer, and so forth. By using the back surface, the front surface remains easily visible to the user, while still permitting the user to interact with the data on the display. In some implementations, the dorsal virtual keyboard and the dorsal virtual pointer may be available simultaneously. For example, a portion of the back touch sensor may be designated as a dorsal virtual pointer input area, discrete from the area designated for the dorsal virtual keyboard.

Support for the dorsal virtual keyboard, dorsal virtual pointer, and so forth is possible on devices that do not have a back sensor but can accommodate placement of a touch sensor behind the device. For example, an electronic device may comprise a front touch sensor and a folding cover configured to fold over the front of the device. An interior portion of the folding cover that is complementary to the front may include a cover touch sensor. When folded back around behind a body of the electronic device, the cover touch sensor is thus available to act as a back touch sensor.

Illustrative Touch-Screen Device

FIG. 1 depicts an electronic device 100 configured with a dorsal virtual keyboard engaged. A front view 102 depicts the front of the device. A front touch sensor 104(1) comprises a touch sensor on at least a portion of the front surface of the device. The touch sensor 104(1) accepts input resulting from application of incident force, such as a user finger or stylus pressing upon the touch sensor.

A display 106 is configured to present information to the user. In some implementations, the display 106 and the front touch sensor 104(1) may be combined to provide a touch-sensitive display, or touchscreen display. As shown here, the display 106 provides a visual keyboard representation 108 of a portion of a keyboard in the QWERTY layout. In other implementations, other layouts may be used, including QWERTZ, AZERTY, QZERTY, Dvorak, and so forth. Furthermore, layouts may include other keyboards such as numeric keyboards, custom keyboards, chordic keyboards, and so forth. The virtual keyboards supported by the device described herein are not limited to those using two hands. For example, one-handed keyboards are also supported.

This visual keyboard representation 108 may be presented, or not, for user convenience. In the example depicted here, the user is completing data entry for the word "cool" and the letter "l" is being entered, as indicated by shading of the "L" key. That is, the user is providing a touch input (on the back of the device) selecting the letter "L," with the front of the device displaying this selection on the visual keyboard representation 108.

Broken line circles denote finger touch points 110. These finger touch points 110 indicate points of contact meeting a minimum force threshold between the user's fingers, stylus, and so forth, and the touch sensor 104 of the device 100.

A back view 112 shows the back of the electronic device 100. A back touch sensor 104(2) is disposed across the back surface of the device. In some implementations, such as shown here, the back touch sensor 104(2) may cover substantially all of the back of the device, while in other implementations the back touch sensor 104(2) may cover only a portion. Also, additional touch sensors along at least portions of other surfaces of the device 100 may be present. For example, touch sensors may be placed, or extend onto, sides of the device 100.

Shown in the back view 112 are eight finger touch points 110 corresponding to the fingers of the user that are in contact with the back touch sensor 104(2). A right hand home row 114 is depicted, showing the initial position of the user's right hand fingers on a virtual home row of a dorsal virtual keyboard. In this illustration an active touch point 118, indicated by shading, shows the user's right ring finger triggering the letter "l."

A left hand home row 116 is also shown, indicating the user's preferred initial position for the left hand portion of the virtual home row. Location and positioning of virtual keys on the virtual keyboard may be relative to one another. For example, as shown here the arrangement of the touch points 110 within the left hand home row 116 differs from the finger touch points 110 of the right hand home row 114. This variation in finger placement may occur for many reasons, including variations in hand size, hand dominance, a user's preferred grip on the electronic device 100, and so forth.

In some implementations, virtual key placement may be absolute, such as may be experienced when typing on a non-virtual keyboard. That is, the physical positioning of the virtual keys on the touch sensor is pre-determined. Thus, the center of the virtual key for the "h" key may be nine millimeters from the center of the virtual "j" key.

In the implementation shown here, virtual key positioning is relative. With relative positioning, it is useful to designate an initial known state. With regards to a keyboard one known state corresponds to the placement of fingers on a "home row" set of keys. For example, in the QWERTY keyboard layout, the home row comprises the left hand keys of "a," "s," "d," "f," and the right hand keys of "j," "k," "l," and ";". An engagement gesture indicates that the user has placed their fingers in the home row configuration, calibrates the system to the pressure applied by the user, and sets the positions of each pressure point from each finger to correspond to a virtual key on the home row of the virtual keyboard. For example, the pressure of individual fingers touching the touch sensor after the engagement gesture may be designated as a light touch. In some implementations, the engagement gesture may be a momentary and substantially simultaneous pressure from each finger of a hand onto touch sensors of the device. Once the home row is set, locations of other virtual keys are mapped relative to the home row. In another implementation the engagement gesture may include the user inputting a calibration phrase to use a larger set of keys than the home row. For example, the user may enter a phrase such as "the quick brown fox jumps over the lazy dog" which uses all of the alphabetic characters to calibrate and map the alphabetic virtual keys.

Figure 2:
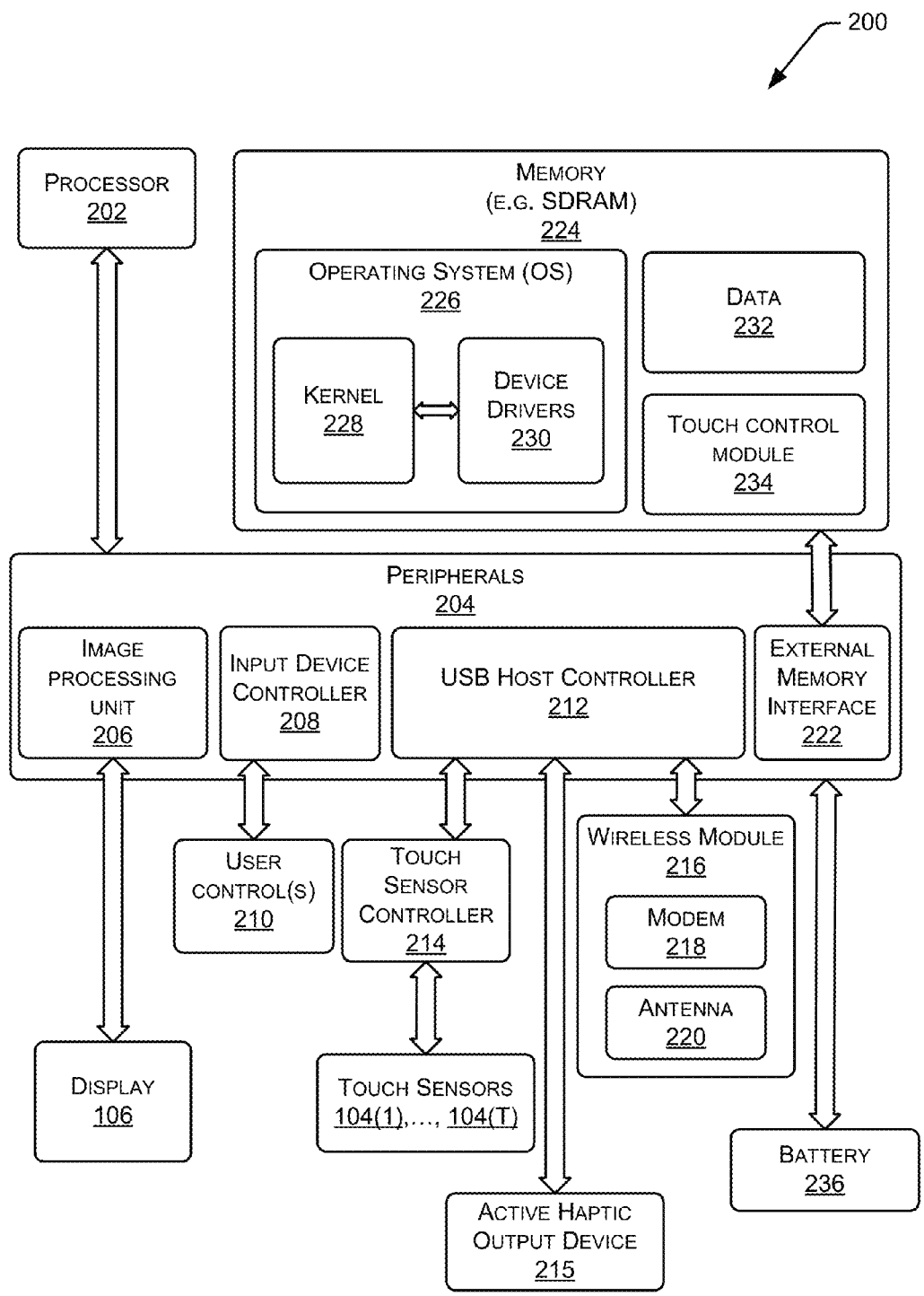
FIG. 2 is an illustrative schematic of the electronic device with a touch control module configured to use at least the back touch sensor to accept user input.

FIG. 2 is an illustrative schematic 200 of the electronic device 100 of FIG. 1. In a very basic configuration, the device 100 includes components such as a processor 202 and one or more peripherals 204. Each processor 202 may itself comprise one or more processors.

Peripherals 204 couple to the processor 202. An image processing unit 206 is shown coupled to one or more display components 106 (or "displays"). In some implementations, multiple displays may be present and coupled to the image processing unit 206. These multiple displays may be located in the same or different enclosures or panels. Furthermore, one or more image processing units 206 may couple to the multiple displays.

The display 106 may present content in a human-readable format to a user. The display 106 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

For convenience only, the display 106 is shown in a generally rectangular configuration. However, it is understood that the display 106 may be implemented in any shape, and may have any ratio of height to width. Also, for stylistic or design purposes, the display 106 may be curved or otherwise non-linearly shaped. Furthermore the display 106 may be flexible and configured to fold or roll.

The content presented on the display 106 may take the form of electronic books or "eBooks." For example, the display 106 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The device 100 may have an input device controller 208 configured to accept input from a keypad, keyboard, or other user actuable controls 210. These user actuable controls 210 may have dedicated or assigned operations. For instance, the actuatable controls may include page turning buttons, a navigational keys, a power on/off button, selection keys, joystick, touchpad, and so on.

The device 100 may also include a USB host controller 212. The USB host controller 212 manages communications between devices attached to a universal serial bus ("USB") and the processor 202 and other peripherals.

FIG. 2 further illustrates that the device 100 includes a touch sensor controller 214. The touch sensor controller 214 couples to the processor 202 via the USB host controller 212 (as shown). In other implementations, the touch sensor controller 214 may couple to the processor via the input device controller 208, inter-integrated circuit ("I$^2$C"), universal asynchronous receiver/transmitter ("UART"), or serial peripheral interface bus ("SPI"), or other interfaces. The touch sensor controller 214 couples to the touch sensors 104(1), 104(2), . . . , 104(T).

The touch sensors 104(1)-(T) may comprise crosspoint arrays, such as capacitive, magnetic, force sensitive resistors, interpolating force sensitive resistors, and so forth. The front touch sensor 104(1) may be configured such that user input through contact or gesturing relative to the display 106 may be received.

One or more of the touch sensors 104(1)-(T) may be configured with passive haptic coatings, active haptic output devices 215, or a combination thereof. These haptic components are configured to generate tactile feedback representing presence, actuation, or both of the virtual keys.

The passive haptic coatings comprise a resilient coating covering the touch sensor. Such a resilient covering provides enhanced user feedback when interacting with the virtual keys, and conveys an impression of actually depressing a physical key. In some implementations, the passive haptic coatings may incorporate surface features such as bumps, ridges, textures, and so forth to denote different regions which may correspond to virtual keys, or virtual key regions. For example, an area designated for a dorsal virtual keyboard may have a cross-hatch texture, while an area designed for a dorsal virtual pointer may have a smooth texture.

The active haptic output devices 215 generate actual or perceived surface features or some sort of physical response. For example, a small vibrator may generate a momentary shaking sensation upon actuation of a virtual key. In other implementations acoustic radiation pressure, microelectromechanical systems, actuators, and so forth may be used to generate actual or perceived feedback.

The touch sensor controller 214 is configured to determine characteristics of interaction with the touch sensor. These characteristics may include the location of the touch on the touch sensor, magnitude of the force, shape of the touch, and so forth. In some implementations, the touch sensor controller 214 may provide some or all of the functionality provided by the touch control module 234, described below.

The USB host controller 212 may also couple to a wireless module 216 via the universal serial bus. The wireless module 216 may allow for connection to wireless local or wireless wide area networks ("WWAN"). Wireless module 216 may include a modem 218 configured to send and receive data wirelessly and one or more antennas 220 suitable for propagating a wireless signal. In other implementations, the device 100 may include a wired network interface.

The device 100 may also include an external memory interface ("EMI") 222 coupled to external memory 224. The EMI 222 manages access to data stored in external memory 224. The external memory 224 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 224 may store an operating system 226 comprising a kernel 228 operatively coupled to one or more device drivers 230. The device drivers 230 are also operatively coupled to peripherals 204, such as the touch sensor controller 214. The external memory 224 may also store data 232, which may comprise content objects for consumption on eBook reader device 100, executable programs, databases, user settings, configuration files, device status, and so forth. Executable instructions comprising a touch control module 234 may also be stored in the memory 224. The touch control module 234 is configured to receive data from the touch sensor controller 214 and generate input strings or commands. In some implementations, the touch sensor controller 214, the operating system 226, the kernel 228, one or more of the device drivers 230, and so forth, may perform some or all of the functions of the touch control module 234.

One or more batteries 236 provide operational electrical power to components of the device 100 for operation when the device is disconnected from an external power supply. The device 100 may also include one or more other, non-illustrated peripherals, such as a hard drive using magnetic, optical, or solid state storage to store information, a firewire bus, a Bluetooth™ wireless network interface, camera, global positioning system, PC Card component, and so forth.

Couplings, such as that between the touch sensor controller 214 and the USB host controller 212, are shown for emphasis. There are couplings between many of the components illustrated in FIG. 2, but graphical arrows are omitted for clarity of illustration.

FIG. 3 is an illustrative graph 300 showing force applied by fingers of one hand and associated touch thresholds. The touch control module 234 within the device 100 processes touch sensor input from the touch sensors 104(1)-(T). Where the touch sensors 104(1)-(T) are capable of providing a magnitude of force, that is, how hard an object is pressing on the touch sensor, the magnitude may be used to set one or more touch thresholds. The touch thresholds may then indicate different input actions, as described below with respect to FIG. 4.

For illustrative purposes, and not by way of limitation, assume that four touch levels are used. These four touch levels consist of no touch, light touch, medium touch, and hard touch. The touch thresholds may be absolute or relative. An absolute threshold is set such that a specific quantity of force is required to meet that threshold. For example, where an absolute threshold is in use, a light touch may comprise a force application of 1 newton (N) while a medium touch is 2 N, and a hard touch 3 N.

Relative touch thresholds, in contrast, may be determined by comparison of force applied between two or more digits or between two or more touches of the same finger. For example, a hard touch may be considered to be three times the force applied by the lightest touch on that same hand. In other implementations, force comparisons may be made between fingers on different hands.

In this illustration, the graph 300 depicts on an x-axis five fingers 302 of one hand and a magnitude of applied force 304 for each of those fingers along a y-axis. This illustration depicts a user's hand 306, in particular the right hand of the user from FIG. 1 during entry of the character "l" from a virtual keyboard. The graph 300 illustrates the fingers of the hand, including a thumb 308, an index finger 310, a middle finger 312, a ring finger 314, and a little finger 316.

The graph 300 also illustrates three touch thresholds. Not shown is the trivial case of the no touch threshold in which no force is applied to the touch sensor 104. The lowest threshold in which force is applied, a light touch threshold 318, is shown with a dashed line. In this illustration, the light touch threshold 318 varies from finger to finger. This may be done to account for variations in the strength of fingers. For example, the little finger 316 generally is able to exert less force than the index finger 310. In some implementations, the threshold may be the same across each of the fingers.

The y-axis of the graph also illustrates a medium touch threshold 320 with a dashed line. The medium touch threshold 320 requires a greater magnitude of applied force to be reached. Additionally, the graph 300 illustrates a hard touch threshold 322 with a dashed line, which requires the greatest amount of applied force to achieve.

In this illustration, the ring finger 314 has exceeded the medium touch threshold 320, but remains below the hard touch threshold 322. Thus, the touch control module 234 interprets this pressure as a medium touch. Similarly, the remaining fingers exceed the light touch threshold 318 and thus are interpreted as producing light touch inputs. This illustrates the situation shown in FIG. 1 in which a user inputs a lowercase "l" on the dorsal virtual keyboard.

Thresholds may also be dynamic and adjust over time. For example, as the user continues to type a long passage using the dorsal virtual keyboard, the user may become more or less forceful in pressing the virtual keys. The touch control module 234 may automatically raise and lower the threshold, allowing the virtual dorsal keyboard, virtual dorsal pointer, and so forth to adapt to the user over time and continue to receive user input.

Additionally, comparisons of touch magnitudes and relative positions of touches, combined with known factors of human physiology, allow determination of the orientation of the user's hand relative to the device. Thus, users may freely engage the back touch sensor from various sides of the device while the touch control module 234 determines the orientation of the user's hands.

The touch control module 234 may also be configured, either manually or automatically, to account for varying number of digits. For example, a user with missing, unusable, or additional digits may still utilize the techniques described herein.

Figure 4:
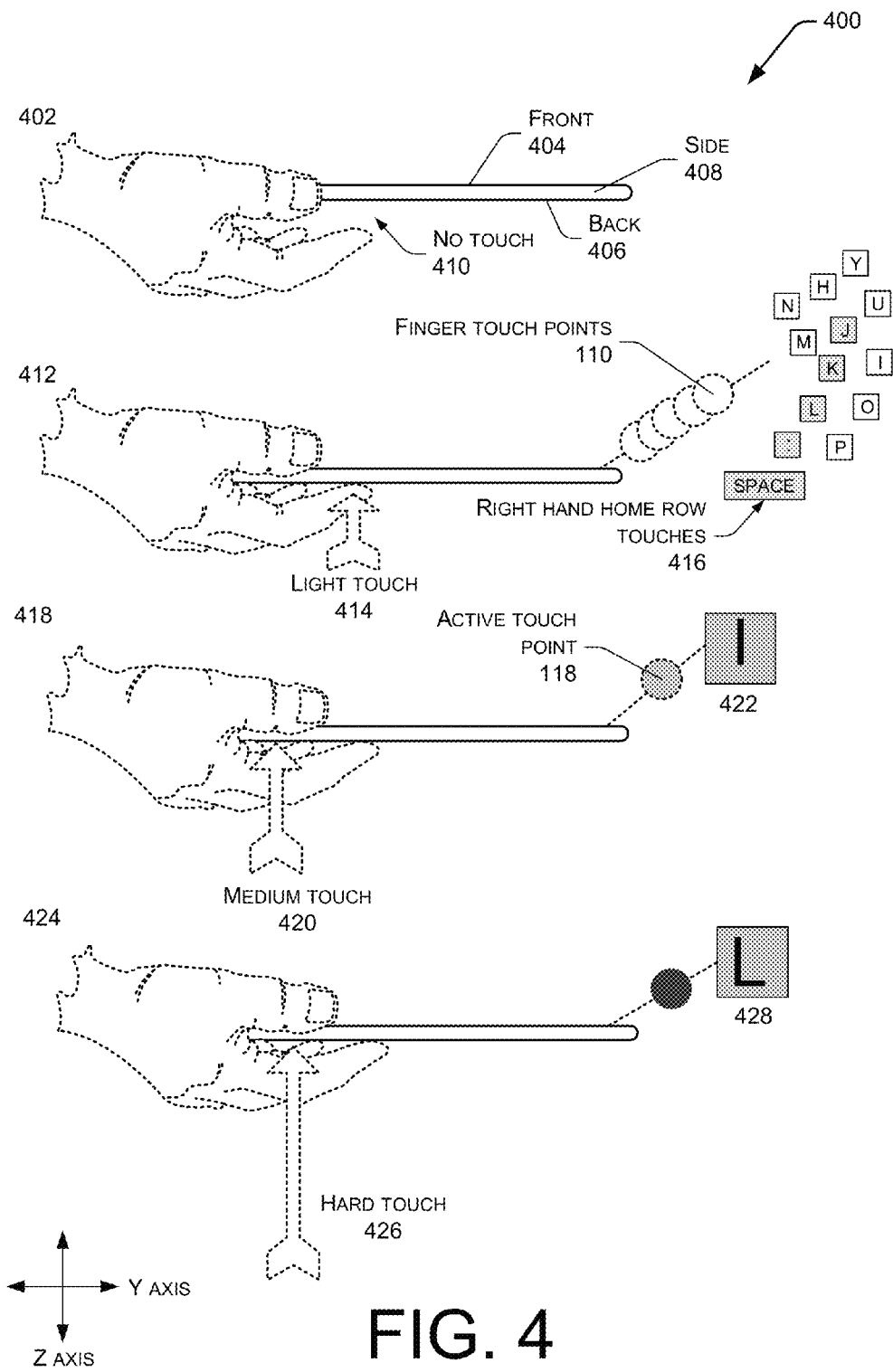
FIG. 4 illustrates a side view of the electronic device depicting various magnitudes of touch force received from a user and a corresponding change in output from the touch sensor.

With touch thresholds configured, the touch control module 234 may use magnitude of the applied force to alter input. FIG. 4 illustrates side views 400 of the electronic device 100 of FIG. 1 depicting application by the user of various magnitudes of touch force and corresponding changes in output.

Different magnitudes of touch may result in different input functions. The side view 402 of the device shows a front 404, a back 406, and a side 408 of the device 100. The user at this point is not touching 410 either the front 404 or the back 406.

The side view 412 of the device depicts the user's hand now lightly touching 414 the device, with the thumb 308 on the front 404 and the remaining fingers (310, 312, 314, and 316) on the back 406. For example, this may be the user resting the fingers of the right hand on the right hand home row 416. With the light touch 414, the touch control module 234 recognizes the position of the fingers, but does not generate an input.

The side view 418 depicts the user generating a medium touch 420 with their right hand ring finger 314. When interpreted by the touch control module 234, this medium touch generates an active touch point 118 which results in the generation of an input of "l" 422.

The side view 424 depicts the user generating a hard touch 426, which the touch control module 234 interprets as the user entering an "L" 428. Thus, in this implementation, the user may generate capital letters, or other characters accessible via a shift key on a keyboard, by pressing more firmly on the virtual keys.

In some implementations, the relative sizes of the virtual keys may vary. Key sizes may be statically varied, for example home row virtual keys are 20% larger than other virtual keys. Key sizes may also be dynamically varied. For example, a probabilistic determination module may attempt to predict a most likely next set of one or more characters to be used, and the key sizes of the corresponding virtual keys may be adjusted proportionate to the probability of use.

In other implementations, other functions may be attributed to the various touch magnitudes, either to the entire virtual keyboard or on an individual virtual key basis. For example, a firm touch may be equivalent to generating a boldface character, underlining the character, the control key, alt key, a numeric key, and so forth. Additional gestures such as tapping may also initiate other functions, such as a control or alt key, select, and so forth.

Usage Scenarios

Figure 5:
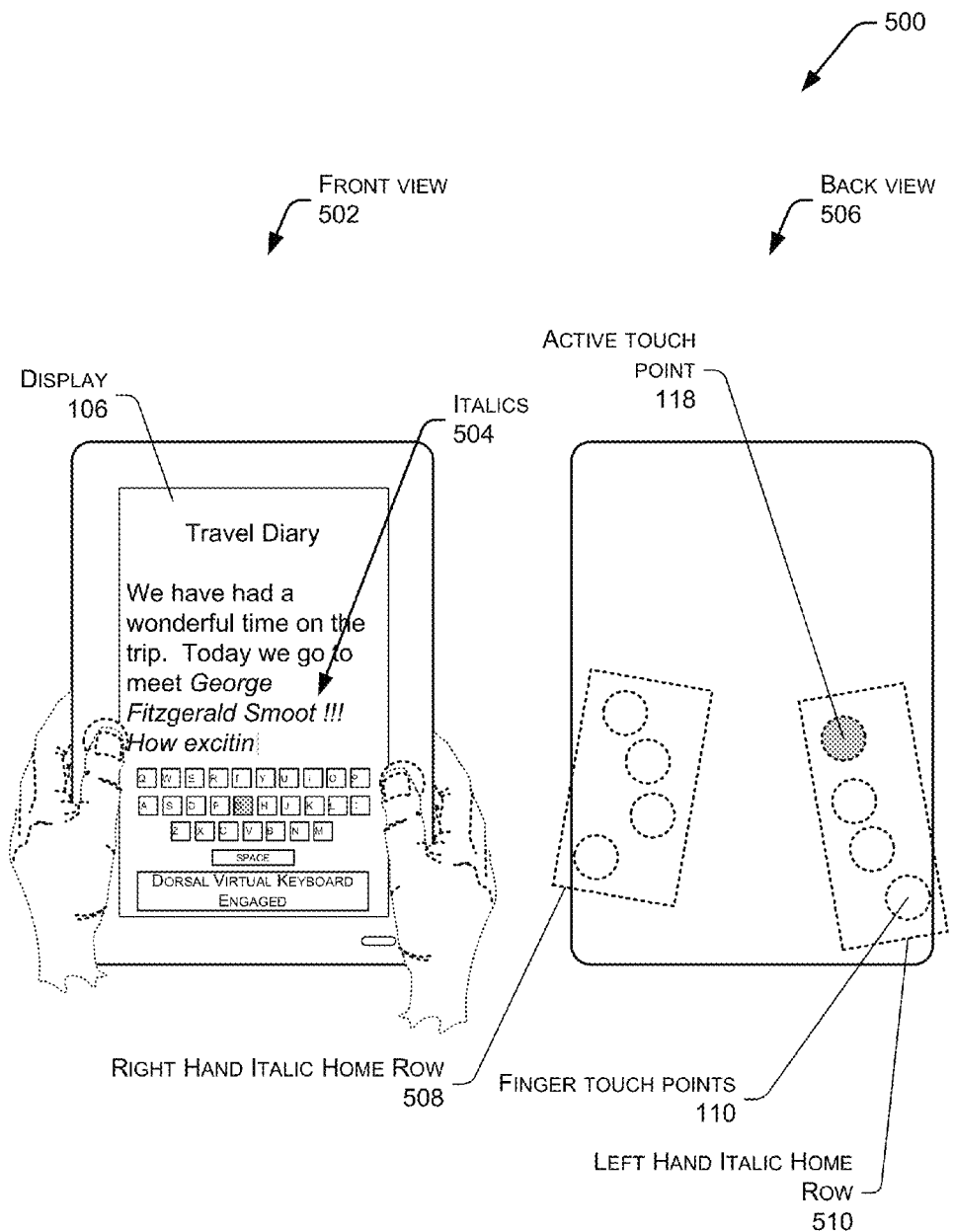
FIG. 5 depicts the electronic device altering the presentation of text input via the dorsal virtual keyboard in response to the user shifting their finger positions.

FIG. 5 depicts the electronic device 100 of FIG. 1 altering the input in response to a user shifting their finger positions 500. By re-orienting the position of at least some of their fingers, the user may change the input to the device 100.

A front view 502 shows the display 106 with a travel diary presented. Within the entry, the user wishes to emphasize a particular portion of the text by altering the input such that the input characters are italic 504. The touch control module 234 alters input data, such as to italics as shown here, when the user rotates their hands such that the home rows are askew of their start position. As shown in a back view 506, the right hand italic home row 508 is now at an angle relative to a y-axis of the device. Likewise, a left hand italic home row 510 is also at an angle relative to the y-axis.

The user may enter this altered input mode by moving fingers placed on the home row in a sliding motion along the back touch sensor to a new position at a relative angle to the original position. Such an altered input mode allows a user to quickly and easily alter input without using function keys or key combinations. In other implementations, the altered input mode may include boldfacing, underlining, inserting a bookmark, inserting a hyperlink, and so forth.

Figure 6:
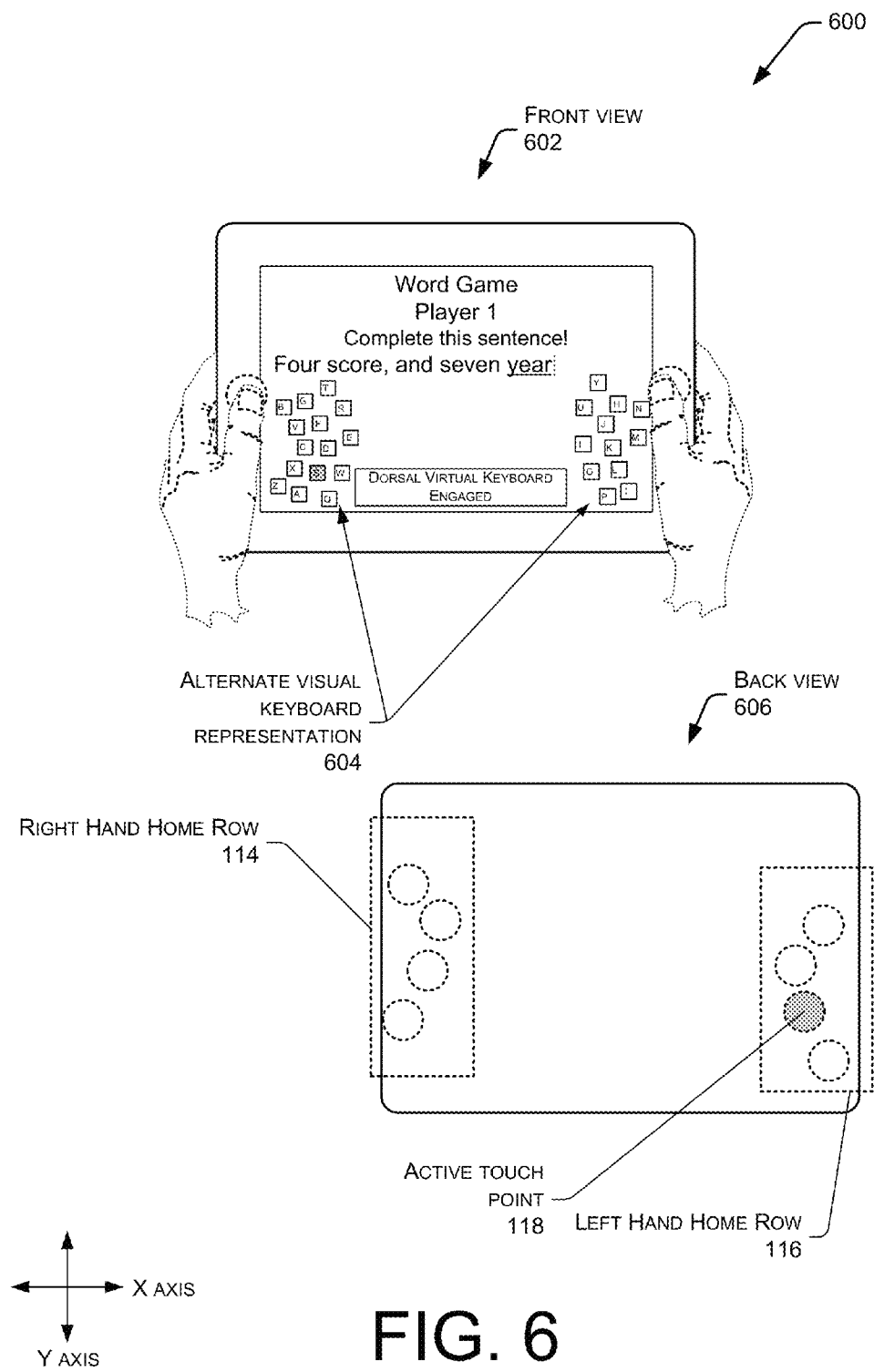
FIG. 6 depicts the electronic device operated in landscape mode using the dorsal virtual keyboard and showing a keyboard representation corresponding to the dorsal virtual keyboard as mapped onto the back touch sensor.

FIG. 6 depicts the electronic device 100 of FIG. 1 operated in landscape mode 600. As shown in a front view 602, the device 100 has been rotated such that the user's hands are positioned on either ends of the longest axis of the device 100.

Also depicted in this illustration is an alternate visual keyboard representation 604. This alternate visual keyboard representation 604 more closely corresponds to the virtual key placement on the back touch sensor 104(2) of the device 100. Note that the virtual keys are distributed in generally arcuate patterns, rotated such that the natural resting position of each of the hands in grasping the device corresponds to the home row keys.

In some implementations, such as when the device includes the front touch sensor 104(1), a "space" character may be mapped to a location on the front surface, such as where one or both of the user's thumbs 308 rest. In other implementations, the space character may be entered by other gestures such as a virtual key on the back touch sensor, pinching gesture between the thumb 308 and one or more of the other fingers on the same hand, and so forth.

A back view 606 shows the right hand home row 114 and the left hand home row 116 in their new positions. The active touch point 118 results from the user's left hand ring finger 314 entering an "s" as shown. By using the back touch sensor 104(2) and freeing the user from dependence upon a physical keyboard, the user is thus able to easily transition the device 100 between portrait and landscape modes while retaining data input capabilities.

Figure 7:
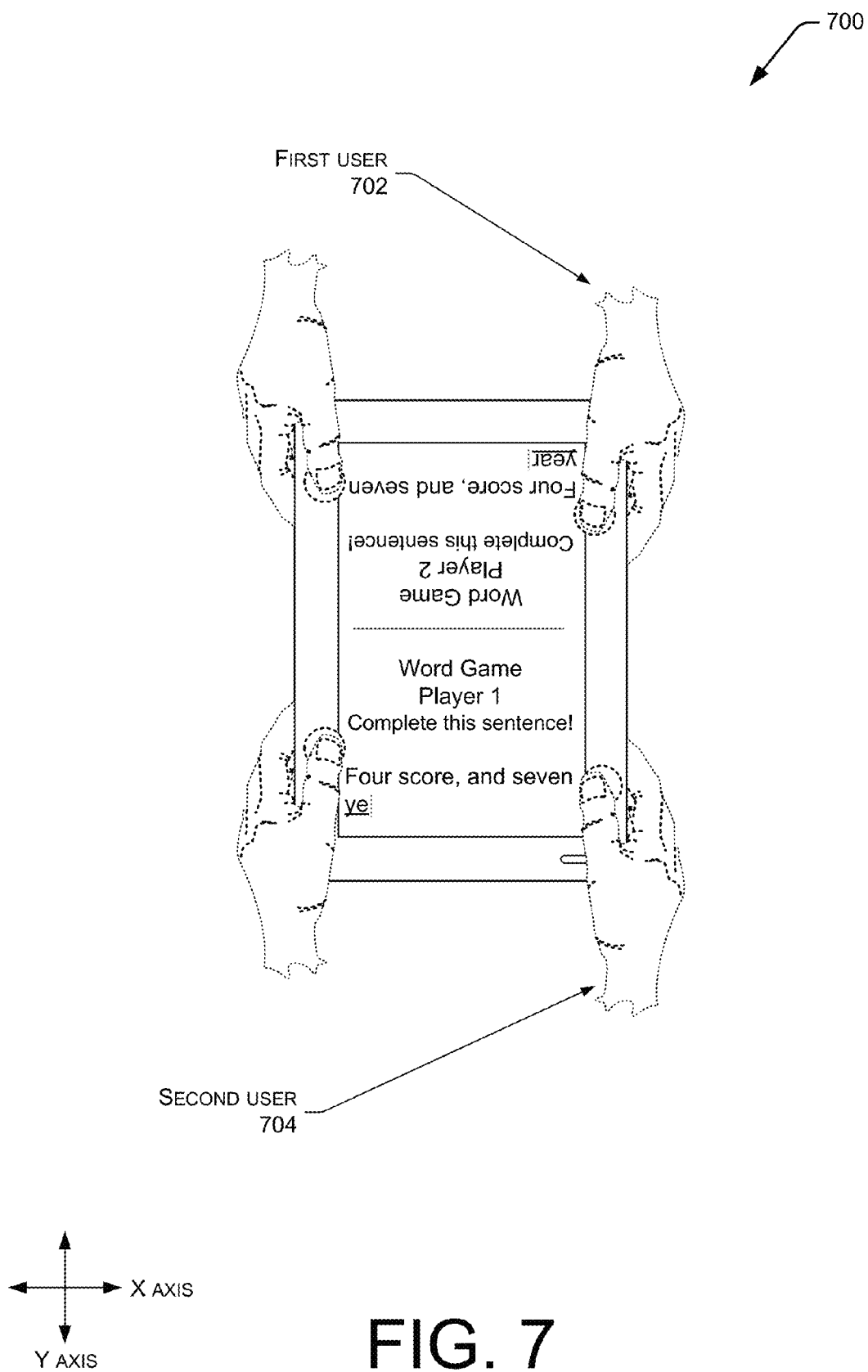
FIG. 7 depicts the electronic device when used by two users contemporaneously, each with their own dorsal virtual keyboard.

FIG. 7 depicts the electronic device 100 of FIG. 1 in a scenario 700 where two users use the device 100 contemporaneously. Because the back touch sensor 104(2) may extend across the entire back surface of the device 100, the virtual keyboard may be engaged anywhere along the back.

In this illustration a first user 702 and a second user 704 are playing a word game with one another on the same device 100. Part of the game involves seeing who can enter the word the fastest, and thus both users are entering data contemporaneously. Here, each user grasps opposite ends of the device and has engaged a virtual keyboard at each end. The touch control module 234, recognizing two sets of hands, maps two separate dorsal virtual keyboards onto the back touch sensor of the device.

Figure 8:
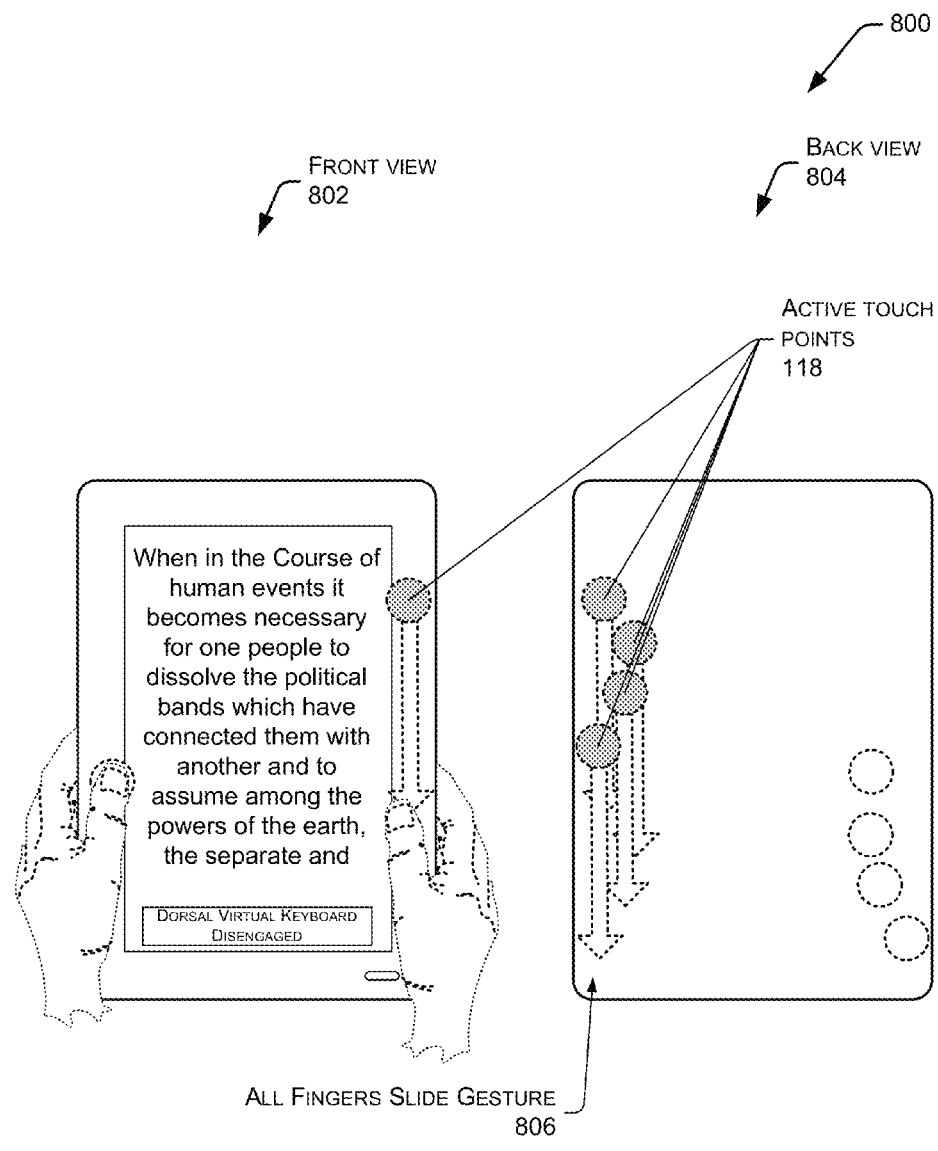
FIG. 8 depicts the electronic device and an all-finger-slide gesture, which may engage or disengage an operating mode such as the dorsal virtual keyboard.

FIG. 8 depicts the electronic device 100 of FIG. 1 and an all-finger-slide gesture 800. The touch control module 234 may accept various gestures to initiate specific actions. For example, the user may disengage the dorsal virtual keyboard mode using an all-finger slide. In other implementations, fewer than all fingers may be used for the slide gesture. For example, the finger slide gesture may include the thumb 308, index finger 310, middle finger 312, and the ring finger 314.

As shown in a front view 802 and a back view 804, the user's hand begins at the upper portion of a side of the device 100. The user applies pressure to each finger of the hand and slides 806 these fingers towards the bottom of the device, relative to data presented upon the display 106. The touch control module 234 may be configured such that a minimum length of slide may be required for the gesture. In another implementation, the slide gesture may be from the bottom of the device 100 towards the top of the device 100.

FIG. 9 depicts the electronic device 100 of FIG. 1 with a dorsal virtual pointer engaged 900. Just as the dorsal virtual keyboard prevents the user from obscuring the display during data entry, the dorsal virtual pointer allows the user to move a cursor, pointer, and so forth without obscuring the display. The touch control module 324 is configurable to provide a dorsal virtual pointer.

In this illustration, a front view 902 shows the user manipulating a pointer 904 on the display 106 after engaging the dorsal virtual pointer. Turning to a back view 906, the user's index finger 310 has been designated by the touch control module 324 as a dorsal virtual pointer input 908. By moving the index finger 310 along the back touch sensor 104(2) of the device, the user may thus move the pointer. As shown here, this may even be done while holding the device with one hand.

Interaction using the back touch sensor 104(2) may allow selection of items, such as shown here, as well as other actions such as playing a game. Additionally, because the magnitude of the force applied is determinable, game play may use force input. For example, a user playing a golf game may vary the magnitude of the applied force to control the force of a simulated golf club on a simulated golf ball.

Figure 10:
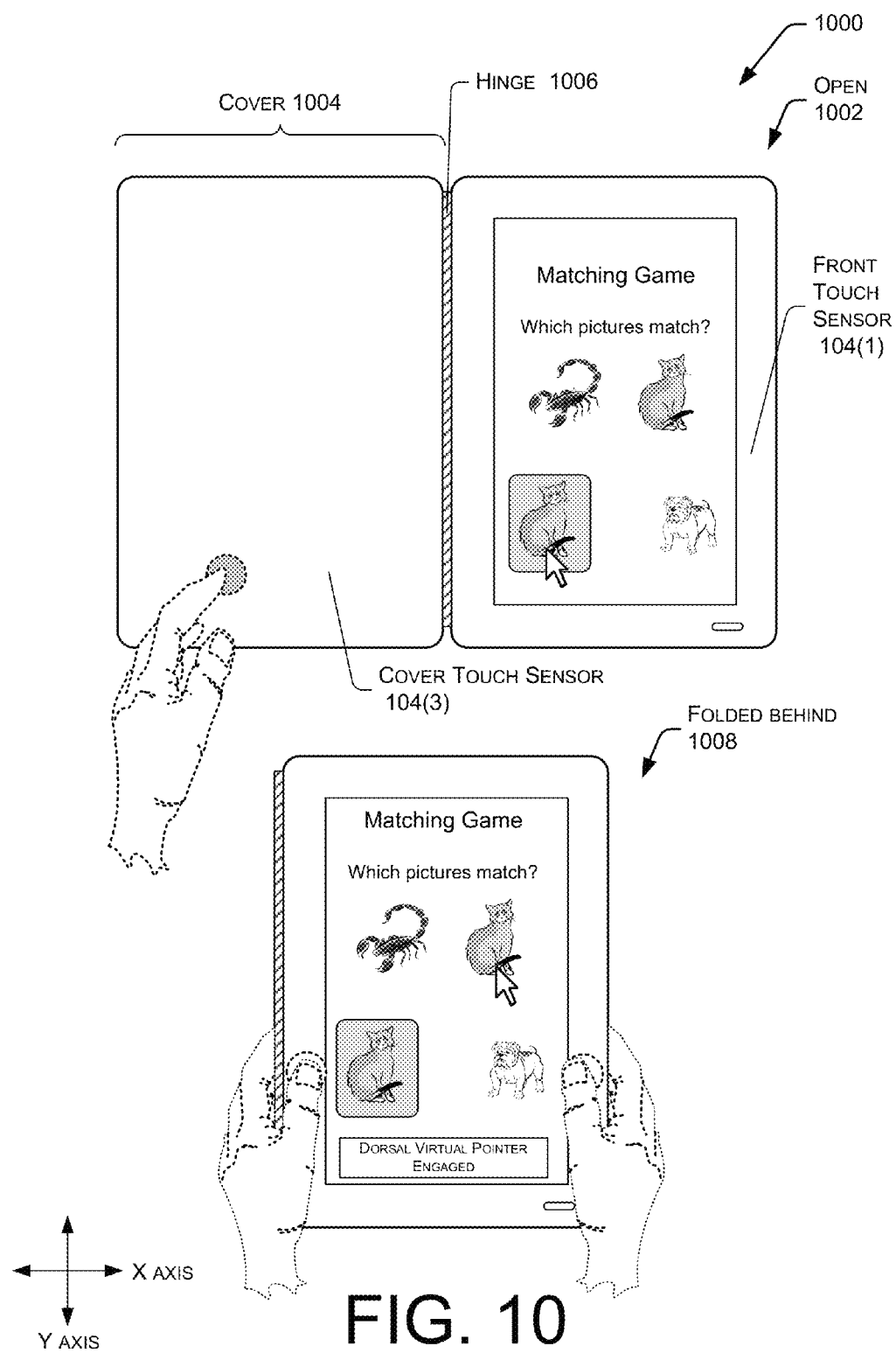
FIG. 10 depicts an electronic device coupled to a cover that incorporates a cover touch sensor, configured such that when folded behind the device the cover touch sensor acts as a back touch sensor.

FIG. 10 depicts an electronic device 1000 shown in an open state 1002 and having a front touch sensor 104(1) coupled to a cover 1004 via a hinge 1006. An interior portion of the cover 1004 is complementary to a front of the device 1000 and comprises a cover touch sensor 104(3). When in a folded behind state 1008, the cover touch sensor 104(3) may be used in lieu of a back touch sensor on the device 1000.

Such an arrangement allows for the device 1000 to have a cover while also providing for the functionality described herein which results from the dorsal virtual keyboard, dorsal virtual pointer, and so forth. Furthermore, this arrangement allows existing devices that support an external touch sensor to gain the functionality described herein.

Figure 11:
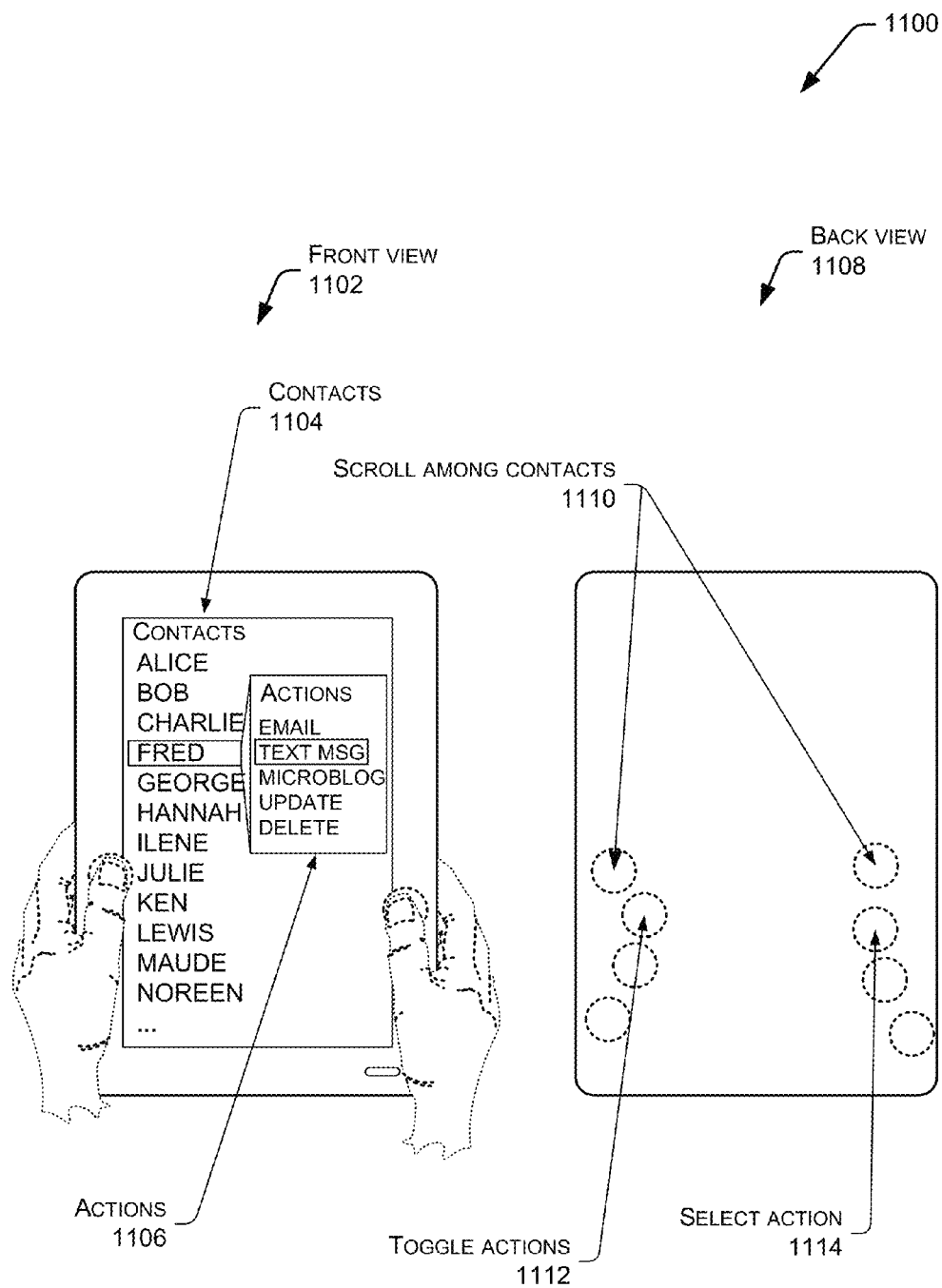
FIG. 11 depicts the electronic device with a dorsal multi-dimensional control array engaged and configured to accept input from at least a portion of the back touch sensor.

FIG. 11 depicts the electronic device with a dorsal multi-dimensional control array 1100 engaged and configured to accept input from at least a portion of the back touch sensor. In addition to entering data via the dorsal virtual keyboard, or the dorsal virtual pointer, users may also use the dorsal multi-dimensional control array 1100 to select items from list, pick actions, and so forth. As with the dorsal virtual keyboard and the dorsal virtual pointer, in some implementations the dorsal multi-dimensional control array may be activated with an engagement gesture.

The dorsal multi-dimensional control array 1100 allows input received from the back touch sensor 104(2) to scroll in two or more dimensions through data, menu options, and so forth. At least a portion of a touch maps to one or more pre-determined commands. For example, as shown in FIG. 11 and front view 1102, suppose the user wishes to select from a list of contacts 1104 a particular contact. The pre-determined commands may be configured such that one or more portions of the back touch sensor 104(2) are designated to scroll forward and backward through the list. The magnitude of pressure exerted may be used to vary the scrolling behavior in a pre-determined fashion. In one implementation, the harder the user presses, the faster the list scrolls.

A menu of actions 1106 related to the contacts 1104 may also be presented. As shown here, the actions include sending an email, sending a text message, initiating a microblog entry, updating the contact record, or deleting. In other implementations, other actions may be provided.

Looking at a back view 1108, different fingers may be associated with different functions. The left and right hand index fingers are configured to scroll through the contacts 1104, allowing movement along this first "dimension." The right hand middle finger is configured to toggle between actions 1112, allowing the user to manipulate data in this second "dimension." The magnitude of a touch may act as a third "dimension."

Continuing the example, the user may press with the right hand middle finger to switch between the actions 1106 email, text message, microblog, and so forth. Once the user has toggled to select a desired action, the left middle finger may be configured to select 1114 the action. This selection of the action 1114, at least partly in response to the touch, activates the one or more pre-determined commands.

Thus, the user may select an item such as a contact, further select an action to take with regards to the selected item, and activate the option, all with fingers touching the back touch sensor 104(2). As shown in the front view 1102, the user has selected to send a text message to Fred.

Illustrated Process of a Dorsal Virtual Input

Figure 14:
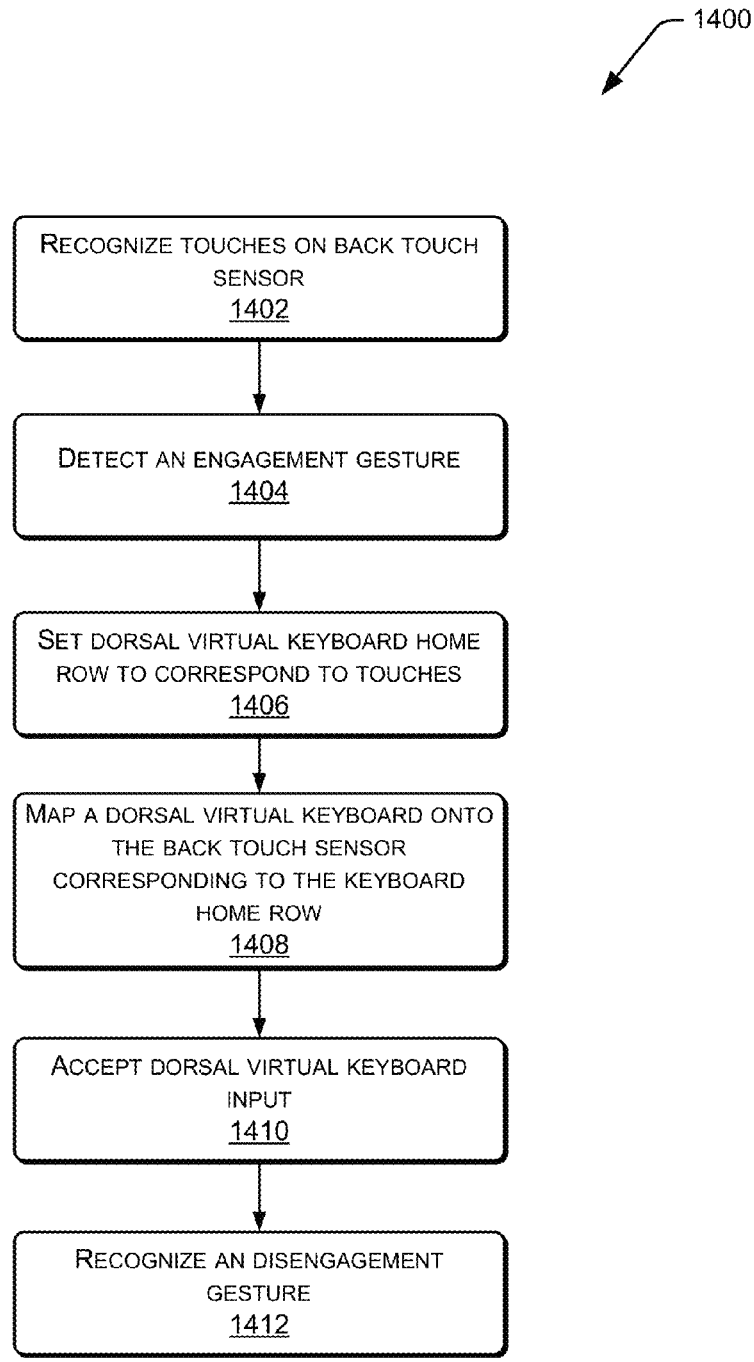
FIG. 14 is an illustrative process of configuring a dorsal virtual keyboard and accepting input from the user.

FIGS. 12-14 illustrate example processes 1200, 1300, and 1400 that may be implemented by the architectures of FIGS. 1-11 or by other architectures. These processes are illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 12 is an illustrative process 1200 of detecting a squeezing gesture involving each finger of a hand. At 1202, the touch control module 234 sets a touch threshold. As described above with respect to FIGS. 3-4, the touch threshold may be absolute in force applied or relative to force applied during other touches, include prior touches.

At 1204, the touch control module 234 detects a squeezing gesture. The squeezing gesture comprises a pressure by the thumb 308 on the front touch sensor 104(1) and pressure from the remaining fingers (310-316) of the hand on the back touch sensor 104(2), where the pressures exceed the touch threshold.

At 1206, a pre-determined action is initiated in response to the gesture. In some implementations, this pre-determined action may include the touch control module 234 engaging a dorsal virtual keyboard, engaging a dorsal virtual pointer, and so forth.

FIG. 13 is an illustrative process 1300 of detecting a squeezing gesture involving a thumb and a finger, such as the index finger of one hand. At 1302, the touch control module 234 sets a touch threshold. Similar to FIG. 12 and with respect to FIGS. 3-4, the touch threshold may be absolute in force applied or relative.

At 1304, the touch control module 234 detects a squeezing gesture. The squeezing gesture comprises a pressure by the thumb 308 on a front touch sensor 104(1) and pressure from at least one finger of the same hand on the back touch sensor 104(2), where the pressures exceed the touch threshold.

At 1306, a pre-determined action is initiated in response to the gesture. In some implementations, this pre-determined action may include engaging a dorsal virtual pointer, engaging a dorsal virtual keyboard, clearing a selection, and so forth.

FIG. 14 is an illustrative process 1400 of configuring a dorsal virtual keyboard and accepting input. At 1402, the touch control module 234 recognizes touches on the back touch sensor 104(2). When the front touch sensor 104(1) is also present, the touch control module 234 may also recognize touches from that source. Touch thresholds, as described above with regards to FIGS. 3-4, may also be set.

At 1404, the touch control module 234 recognizes an engagement gesture. In one implementation, this engagement gesture may include the all-finger-squeeze gesture described above with regards to FIG. 12. Different engagement gestures may engage different virtual keyboards. For example, a three finger squeeze gesture may engage a numeric-only keyboard.

At 1406, in response to the engagement gesture, the touch control module 234 sets a dorsal virtual keyboard home row to correspond to the touches. For example, where the dorsal virtual keyboard uses the QWERTY layout, the touches of the fingers on the left hand may correspond to the keys of "a," "s," "d," "f," while the touches of the fingers on the right hand correspond to the keys of "j," "k," "l," and ";". In addition, the touch control module 234 may calibrate the touch sensors 104 following the engagement gesture. For example, after the engagement gesture has completed, the touch control module 234 may define the pressure with which each finger touches the touch sensor(s) 104 as a light touch 414.

At 1408, the touch control module 234 maps a dorsal virtual keyboard onto the back touch sensor, corresponding to the position of the dorsal virtual keyboard home row. This positioning may be relative or absolute, as described above.

At 1410, the dorsal virtual keyboard accepts input. For example, the touch control module 234 may determine the magnitude of the force applied and the position to determine which character to input, and if any special alteration such as boldface, italic, control function, and so forth is called for.

At 1412, the touch control module 234 recognizes a disengagement gesture and discontinues the dorsal virtual keyboard. In one implementation, the disengagement gesture may comprise the all fingers swipe as described above with regards to FIG. 8.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. An electronic device comprising:
   one or more processors;
   memory coupled to the one or more processors;
   a display coupled to the one or more processors to present a content item;
   a front surface via which the content item is viewable and a back surface opposite the front surface;
   a touch sensor disposed along at least a portion of the back surface;
   instructions stored in the memory and executable on the one or more processors, wherein the instructions, in conjunction with the touch sensor, cause the one or more processors to:
   receive a touch input via the touch sensor at one of a plurality of locations, the one of the plurality of locations being mapped to a pre-determined command of a multi-dimensional control array; and
   cause an action to be performed relative to the content item based on the pre-determined command mapped to the one of the plurality of locations.

2. The electronic device of claim 1, wherein the instructions are further executable to detect an engagement gesture, the engagement gesture being used to activate functionality of the touch sensor.

3. The electronic device of claim 1, wherein the pre-determined command is one of a plurality of pre-determined commands, and selective ones of the plurality of pre-determined commands are mapped to respective ones of the plurality of locations mapped to the multi-dimensional control array.

4. The electronic device of claim 1, wherein the instructions are further executable to determine a magnitude of a force of the touch input, and wherein the pre-determined command is one of a plurality of pre-determined commands, and selective ones of the plurality of pre-determined commands are mapped to respective determined magnitudes of force.

5. An electronic device comprising:
   one or more processors;
   memory coupled to the one or more processors;
   a housing;
   a display disposed in the housing and coupled to the one or more processors to present a content item;
   a touch sensor coupled to the housing at a location apart from the display; and
   instructions stored in the memory and executable by the one or more processors, wherein the instructions program the one or more processors to:
   receive touch input information from the touch sensor, the touch input information including an indication of a touch at a position on the touch sensor associated with a multi-dimensional control; and
   cause an action to be performed using the content item based on a pre-determined command mapped to the position on the touch sensor.

6. The electronic device of claim 5, further comprising a front surface via which the content item is viewable and a back surface opposite the front surface, wherein the touch sensor is disposed along at least a portion of the back surface.

7. The electronic device of claim 5, wherein the touch input information includes a position of the touch on the touch sensor.

8. The electronic device of claim 5, wherein the pre-determined command is one of a plurality of pre-determined commands, selective ones of the plurality of pre-determined commands being mapped to respective positions on the touch sensor.

9. The electronic device of claim 5, wherein the touch input information includes a magnitude of force of the touch.

10. The electronic device of claim 9, wherein the pre-determined command is one of a plurality of pre-determined commands, selective ones of the pre-determined commands corresponding to respective magnitudes of force of the touch input.

11. The electronic device of claim 5, wherein the action comprises manipulation of data on the display.

12. The electronic device of claim 5, wherein the action comprises manipulation of a list of items.

13. The electronic device of claim 12, wherein the manipulation of the list of items comprises at least one of selecting an item in the list or scrolling through the list.

14. The electronic device of claim 5, wherein the instructions are further executable by the processors to detect an engagement gesture requesting to activate functionality of the touch sensor.

15. A method performed by a device having a display and a touch sensor, the method comprising:
   detecting, by the device, a magnitude of force of a touch input using the touch sensor, wherein the touch sensor is located apart from the display;
   determining, by the device, that the magnitude of force of the touch input corresponds to a first predetermined command; and
   executing, by the device, the first predetermined command.

16. The method of claim 15, further comprising:
   detecting, by the device, an engagement gesture comprising one or more touches on the touch sensor; and
   activating the touch sensor based at least in part on detecting the engagement gesture.

17. The method of claim 15, wherein the executing the predetermined command comprises manipulating a content item displayed on the display.

18. The method of claim 17, wherein the manipulating the content item comprises selecting an action to take relative to data on the display.

19. The method of claim 15, further comprising detecting a position of the touch input.

20. The method of claim 19, further comprising:
   determining, by the device, that the position of the input corresponds to a second pre-determined command; and
   executing, by the device, the second predetermined command.

* * * * *